Brainerd & Burridge,
Leaching Apparatus.
Nº 34,873. Patented Apr. 8, 1862.
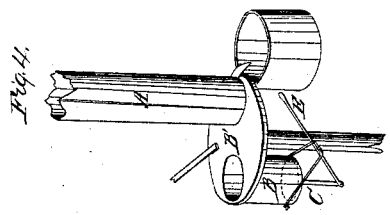
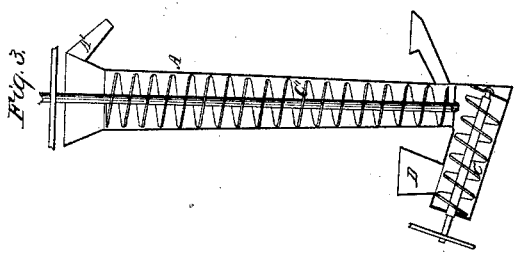
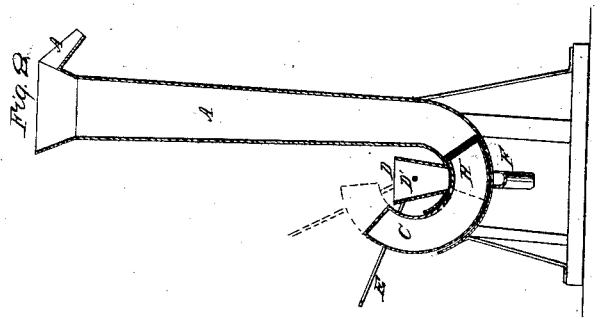
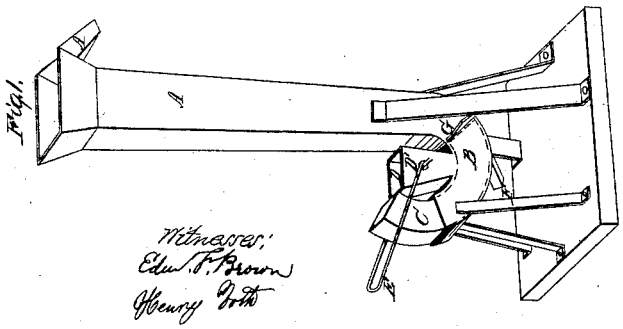
Witnesses:
Edw. P. Brown
Henry Todd
Inventors:
J. Brainerd
W. H. Burridge

UNITED STATES PATENT OFFICE.

JEHU BRAINERD AND WILLIAM H. BURRIDGE, OF CLEVELAND, OHIO.

IMPROVED PROCESS OF EXTRACTING THE STRENGTH OF BARK FOR TANNING AND OTHER PURPOSES.

Specification forming part of Letters Patent No. 34,873, dated April 8, 1862.

*To all whom it may concern:*

Be it known that we, JEHU BRAINERD and WILLIAM H. BURRIDGE, of Cleveland, in the county of Cuyahoga and State of Ohio, have invented a new and useful Improvement in a Process for Obtaining the Extractive Properties of Tan-Bark and other Substances by Displacement; and we do hereby declare that the following is a full and complete description of the same, reference being had to the accompanying drawings, presented in illustration of the process and making part of this specification, in which—

Figure 1 is a perspective view, Fig. 2 is a vertical section, and Figs. 3 and 4 represent variations in structure, of the same general apparatus.

Like letters refer to like parts in the several views.

The nature of our invention relates to extracting the strength (tannin) from bark and other similar substances by displacement, every portion of the bark being subjected to the action of heated water or heated spent tan-liquor before said water or spent tan-liquor becomes saturated with the dissolved tannin, thus insuring two important objects—first, the complete extraction of the tannin from the bark, and, second, obtaining a liquor completely saturated with tannin. The apparatus for accomplishing this may be varied in structure; but the distinguishing feature is the introduction of the bark at the bottom of a cylinder or tube placed upright, while the water enters at the top, the whole of the water thus necessarily passing through all or the bark in its downward course, thus carrying with it all the soluble properties, which it removes by displacement. The bark being discharged at the top, it necessarily follows that all of the bark is brought into contact with the uncharged liquid.

In the accompanying drawings three different forms of apparatus are shown, but which involve the same general features above noted, and still other forms of the same character might be shown; and we desire to be understood that we do not intend to confine ourselves to the particular device shown in Figs. 1 and 2, but to use this or any variation thereof, so long as we preserve the leading and characteristic features of the invention.

A, Figs. 1 and 2, represents a hollow cylinder, which may be either round or square, from two to three feet in diameter, and in height about twenty feet. The cylinder has a true taper from the bottom to the top, being a little larger at the top, as shown in the figures. The lower end B has a semicircular termination, in which a semicircular piston or plunger C is caused to operate. This semicircular piston or plunger has its fulcrum at D' on the two sides of the hopper D. This hopper D is placed at the lowest part of the semicircle B and through which the bark is introduced into the cylinder. The fulcrum D' of the plunger being the center point of the segment of the circle B, its movement in the circle B is natural and easy.

E is the lever by which the plunger C is operated. F is a spout to conduct the saturated tan-liquor into a reservoir or vat.

G is a sliding gate, which is shoved in between the plunger and bark, to prevent the bark from falling back after having been lifted into the cylinder A when the plunger is withdrawn.

When the plunger is raised, as indicated by the dotted lines in Fig. 2, and the gate G shoved in, the space H beneath the hopper D will be clear, and if the hopper is now filled with dry bark the space H will also become filled. Now, by withdrawing the gate G and carrying the plunger downward the bark in the space H will be forced into the upright hollow cylinder A. The gate G being now shoved in between the forward end of the plunger and bark, the plunger can be withdrawn and another charge of bark introduced, and so on until the cylinder A is full. Now, by introducing heated water at the top of the cylinder A over the surface of the bark until all the bark in the cylinder becomes saturated a concentrated liquor will flow from the spout F, and by the continuous introduction of bark at the bottom of the cylinder and the continuous flow of water through the bark, as above described, all the tannin or other extractive matter will become displaced, and the water as it passes downward through the bark carries with it the tannin, becoming more and more highly charged unto saturation. Now, every charge of bark that is introduced at H will displace an equal quantity of spent bark at the top of the cylinder A, and this process being continuously kept up, a continuous flow of concentrated tan-liquor will issue from the pipe F, and the spent bark will slide from the apron A' at the top of the cylinder A; and should it require fifty charges to fill the cylinder then every charge will undergo an equivalent of that number of "leachings," thus obtaining all the strength of the bark, besides obtaining a liquor of uniform strength.

Instead of the plunger shown in Figs. 1 and 2, we contemplate using any other convenient devices which will accomplish the same object—namely, we may use the Archimedean screws C C' (shown in Fig. 3) for the purpose of carrying the bark into the upright cylinder; or a charger B, Fig. 4, may be placed below and connected with a revolving disk B'. The charger, being filled with bark, is rotated beneath the cylinder and the contents forced into the cylinder by means of the plunger C and lever E in Fig. 4.

The superior advantages of this method of extracting the strength of tan-bark and other substances by displacement will be apparent when we state that the universal practice now is to put the dry bark into a large tank, saturate it with water or spent tan-liquor, and bring the whole to a boiling-heat by means of a steam-pipe. The decoction thus obtained is drawn off and a second "leaching," as it is termed, usually takes place; but it must be observed that if a ton of bark requires a ton of water to saturate it this amount of water must remain behind in drawing off the decoction and is as fully charged with tannin as that which is drawn off for use, thus losing at least one-third of all the strength of the bark. By our improved method all of this is saved without an increase in the volume of water used.

The whole interior of the cylinder A may be heated, together with the contents thereof, by introducing a steam-pipe at or near the base, which will greatly facilitate the extracting process.

What we claim as our invention, and desire to secure by Letters Patent, is—

Obtaining the extractive properties of bark by the process herein described.

J. BRAINERD.
W. H. BURRIDGE.

Witnesses:
EDM. F. BROWN,
T. T. EVERETT.